A. E. BRONSON.
DUST CAP CONSTRUCTION.
APPLICATION FILED JAN. 5, 1921.
1,418,524. Patented June 6, 1922.
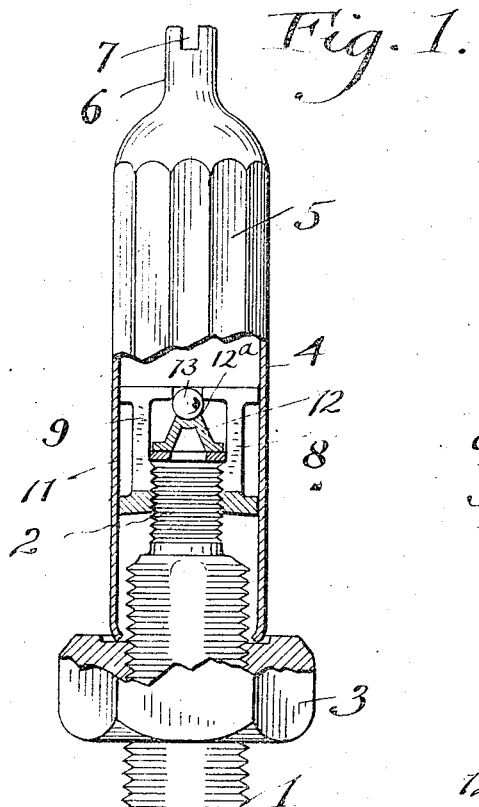
Fig. 1.
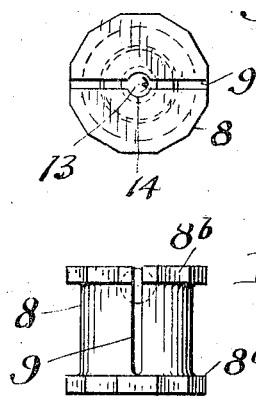
Fig. 3.
Fig. 2.
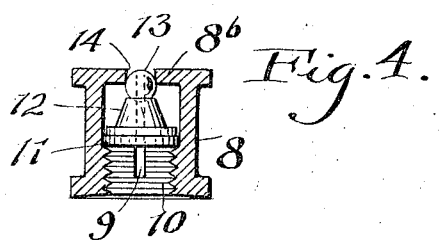
Fig. 4.
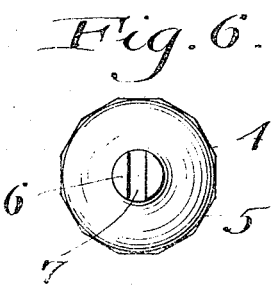
Fig. 6.
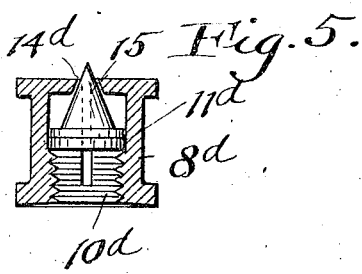
Fig. 5.
Inventor:
Adelbert E. Bronson
Thurston Kwis & Hudson
attys.

UNITED STATES PATENT OFFICE.

ADELBERT E. BRONSON, OF CLEVELAND, OHIO.

DUST-CAP CONSTRUCTION 1,418,524.  Specification of Letters Patent.  Patented June 6, 1922.

Application filed January 5, 1921. Serial No. 435,114.

*To all whom it may concern:*

Be it known that I, ADELBERT E. BRONSON, a citizen of the United States, residing at Cleveland, in the county of Cuyahoga and State of Ohio, have invented a certain new and useful Improvement in Dust-Cap Constructions, of which the following is a full, clear, and exact description.

The present invention relates to dust caps which are more particularly intended for use upon valve stems for pneumatic tires or valve stems for any similar of analogous article.

One of the objects of the invention is to provide a dust cap which is quickly detachable in contradistinction to dust caps of usual construction which have to be turned over a great portion of the threaded length of the valve stem in detaching or attaching the same.

A further object of the invention is to provide a valve cap in which the retaining or holding member by which the dust cap is ultimately secured to the valve stem is operated by engagement with the valve stem, and additionally, in certain instances performs the additional function of sealing the end of the valve stem.

Reference should be had to the accompanying drawings forming a part of this specification in which Fig. 1 is an elevation with portions in section of the end of a valve stem with a rim nut and a dust cap of the present invention mounted upon the valve stem; Fig. 2 is an elevation of a retaining member; Fig. 3 is a top plan view of the showing in Fig. 2; Fig. 4 is a sectional elevation of the showing in Fig. 2; Fig. 5 is a sectional elevation of a modified form; Fig. 6 is a top plan view of the form shown in Fig. 1.

Referring to the drawing, 1 indicates a valve stem of usual characteristics, and threaded on its external surface, and further provided with an extension 2 which is also threaded upon its external surface. The foregoing construction is of the usual construction of valve stems as at present used.

Upon the valve stem 1 is a nut 3 known as a rim nut, which is threaded onto the valve stem after the valve stem is inserted through the hole which is usually provided in the felloe of a wheel to receive the valve stem. The nut being threaded on the valve stem engages with the inner side of the felly of the wheel and holds the valve stem in position.

The dust cap comprises an elongated shell 4 which is open at its lower end and closed at its outer end. This dust cap is usually made of sheet metal and is so formed as to have a plurality of columnar faces or facets as indicated at 5 in Fig. 1. This latter construction is a desirable one, but other forms may be used.

The outer end of the dust cap is formed with a projecting member 6 which is provided with a slot 7 formed therein. This slotted projection comprises a screw driver by which the valve insides may be removed from the valve stem in a manner which is well understood by those familiar with this art.

Within the dust cap 4 is a retaining member which may be generally represented at 8. This member is cylindrical and at its upper and lower ends is provided with flanges $8^a$ and $8^b$ which flanges at their periphery are formed with flat faces, which faces are complementary to the faces or facets 5 of the dust cap shell so that when the retaining member 8 is inserted within the shell it may slide within the shell but cannot rotate with respect thereto.

The foregoing provision is but one construction which may be utilized to prevent relative turning between the retaining member and the shell of the dust cap and it will be understood that the invention is not limited to the construction which has just been described.

The retaining member 8 is provided with a slot such as indicated at 9, which slot extends completely through the retaining member and down to the lower extension or base $8^a$, thus making in effect an incompletely split nut.

The retaining member 8 is hollow and upon a portion of the interior surface it is provided with threads as indicated at 10, these threads being adapted to engage with the threaded extension 2 of a valve stem to engage therewith. Within the retaining member 8 and beyond the threads 10 is a washer or packing member 11 which may be formed of lead or any other suitable material and this washer is usually held in its place by the friction of the engagement of the periphery of the washer with the inner surface or wall of the retaining member 8.

Above the washer 11 is located a pedestal 12. This pedestal is hollow and is without perforation so that when the member 8 is threaded on the end of a valve stem, the end of the valve stem is sealed so far as the passage of air is concerned by the engagement of the washer 11 upon the top of the valve stem extension 2 and further, from the fact that the pedestal 12 is imperforate.

The top of the pedestal is provided with a depression such as indicated at $12^a$ which depression is adapted to support a spherical member 13. The portion of the top member $8^b$ of the retaining member 8 which is directly above the pedestal 12 is provided with a circular opening 14 and the spherical member 13 is held up to this opening. The engagement between the spherical member 13 and the cooperating walls of the opening 14 are however, under normal conditions only of such a nature as will not expand the split retaining member 8.

When the dust cap is assembled upon a valve stem and the threaded extension 2 is caused to engage with the threaded interior of the member 8, the washer 11 eventually engages the end of the threaded portion 2, which in turn pushes the pedestal 12 outwardly and with it the spherical member 13. This spherical member 13 pushes the sides of the split member 8 outwardly causing them to impinge tightly against the inner wall of the shell 4 and the continued rotation of the shell will soon expand the split portion of the retaining member 8 so that the shell of the dust cap will be held in a definite position due to this frictional retention.

When the dust cap is turned in a manner to detach the member 8 from the threaded extension 2 of the valve stem, the inherent resiliency of the retaining member 8 forces the spherical member 13 inwardly and so that the member 8 is returned to its initial position.

It will be apparent that upon an original application of the dust cap to a valve stem, the retaining member 8 may be threaded upon the end of the valve stem and before the tightening action is complete the shell may be shoved over the valve stem until it is in contact with the rim nut or with the rim or felly of the wheel where no rim nut is used and upon further turning of the shell of the dust cap the clamping action will insue.

After the retaining member 8 has been adjusted to proper position within the shell 4 with respect to any given valve stem, it may be attached by merely turning the valve stem as an entirety and it is only required that the dust cap be rotated sufficiently so that the few threads of the end of the valve stem may be engaged by the threads of the retaining member 8. In any event the number of threads required to effect attachment is a limited number and the threading on or off may be quickly accomplished.

In Fig. 5 a modified form of the invention is shown. The retaining member which is indicated at $8^d$ is precisely the same in construction as the retaining member 8 and the threaded portion $10^d$ is the same as before described. Within the retaining member $8^d$ is a washer $11^d$ which is the same as the washer 11. Above the washer $11^d$ is a conical shaped member 15 which conical member rests upon the washer $11^d$ but the conical end extends through an opening $14^d$ and engages with the top portion of the member $8^d$ in a manner similar to the engagement of the spherical member 13 with the recess 14. With the construction described in Fig. 5 the operation is precisely the same, that is to say, when the retaining member $8^d$ is threaded upon the valve stem, the end of the valve stem will push the washer $11^d$ and the conical member 15 upwardly thus expanding the upper end of the split nut and causing the frictional engagement between the edge of the upper flange of the split nut in precisely the same manner as was described with respect to the member 8.

Having described my invention, I claim:

1. A dust cap comprising a shell which is open at one end, a member within said shell which slidably engages the inner wall of the shell, said member having oppositely disposed portions which may be expanded, expanding means cooperating with the said member by which the expansible portions may be expanded, said member having a threaded opening by which it may be attached to a threaded stem and the expanding member operated.

2. A dust cap comprising a hollow shell which is open at one end, a hollow slidable member engaging the inner wall of said shell, a portion of the interior of said slidable member being threaded and adapted to engage with the threads upon a threaded stem, said member being formed with oppositely disposed parts which may be expanded, means associated with the said slidable member for causing expansion of the expansible parts of the same when the said slidable member is screwed upon a threaded stem.

3. A dust cap comprising a hollow shell, one end of which is open, a slidable member engaging the inner wall of said shell, said slidable member having a cross slot extending partially through the same in a longitudinal direction, thereby forming expansible portions of said slidable member, expanding means associated with the slidable member for expanding said expansible portions of the slidable member, said slidable member being provided with a threaded opening which is adapted to engage with a threaded stem, for the purpose described.

4. A dust cap comprising a hollow shell, one end of which is open, a hollow slidable member engaging the inner wall of said shell, said slidable member having expansible portions adapted to engage with the side wall of the shell, the said slidable member being provided with an opening formed in the expansible portions, expanding means cooperating with said opening and lying within the slidable member, said slidable member being provided with a threaded opening which is adapted to engage with a threaded stem and thereby move the said expanding means to expand the expansible portion of the slidable member against the wall of the shell.

5. A dust cap comprising a hollow shell, one end of which is open, a hollow slidable member within said shell, said slidable member being partially split longitudinally, a movable member within the slidable member and cooperating with the end of the slidable member which is split, the said slidable member being provided with a threaded opening adapted to receive a threaded stem.

6. A dust cap comprising a hollow shell open at one end, a hollow slidable member within said shell, said slidable member being partially split longitudinally, thereby providing expansible portions which may be forced against the wall of the shell, a spherical member cooperating with the said expansible portions of the slidable member, a member within the hollow slidable member which supports the member, said supporting member being capable of movement within the hollow slidable member, a washer within the hollow slidable member, said slidable member having a threaded opening which is adapted to cooperate with a threaded stem.

7. A dust cap comprising a shell which is open at one end, a hollow slidable member engaging the inner wall of said shell, said slidable member being partially split longitudinally thereof, thereby providing expansible portions of the slidable member, a hollow member within the slidable member and having limited movement to engage and expand the expansible member, a washer having an opening therethrough, the washer engaging with an end of the said hollow member, the slidable member being provided with a threaded opening which is adapted to engage with a threaded stem, for the purpose described.

8. A dust cap comprising a hollow shell which is open at one end thereof, a slidable member engaging with the inner wall of the said shell, said slidable member being hollow and provided with a longitudinal slot extending partially through the same, thereby providing two expansible portions, expanding means within the hollow slidable member, which are adapted to expand the expansible portions of the slidable member, said means comprising a member with a central depressed portion, a washer having a central opening, which washer is located within the slidable member and cooperating with the said member with the central depression, the said hollow member being provided with a threaded opening adapted to receive the threaded end of a valve stem, for the purpose described.

9. A dust cap comprising a shell which is open at one end, a member having a central opening within said shell, which member slidably engages the inner wall of the shell, the said member having oppositely disposed portions which may be expanded, expanding means within the central opening of the said member, cooperating means upon the expanding means and the portions of said member adapted to be expanded for the purpose described.

In testimony whereof, I hereunto affix my signature.

ADELBERT E. BRONSON.